US012080457B2

(12) United States Patent
Kumaoka et al.

(10) Patent No.: US 12,080,457 B2
(45) Date of Patent: Sep. 3, 2024

(54) SOFT MAGNETIC METAL ALLOY AND ELECTRONIC COMPONENT

(71) Applicant: TDK Corporation, Tokyo (JP)

(72) Inventors: Hironobu Kumaoka, Tokyo (JP); Akito Hasegawa, Tokyo (JP); Kazuhiro Yoshidome, Tokyo (JP); Hiroyuki Matsumoto, Tokyo (JP)

(73) Assignee: TDK Corporation, Tokyo (JP)

( * ) Notice: Subject to any disclaimer, the term of this patent is extended or adjusted under 35 U.S.C. 154(b) by 19 days.

(21) Appl. No.: 17/028,234

(22) Filed: Sep. 22, 2020

(65) Prior Publication Data

US 2021/0098162 A1 Apr. 1, 2021

(30) Foreign Application Priority Data

Sep. 27, 2019 (JP) ................................ 2019-177411
Aug. 3, 2020 (JP) ................................ 2020-131575

(51) Int. Cl.
*H01F 1/153* (2006.01)
*H01F 1/20* (2006.01)

(52) U.S. Cl.
CPC ..... *H01F 1/15308* (2013.01); *H01F 1/15325* (2013.01); *H01F 1/15333* (2013.01); *H01F 1/20* (2013.01)

(58) Field of Classification Search
CPC ............. H01F 1/15308; H01F 1/15325; H01F 1/15333; H01F 1/20; H01F 1/14766
See application file for complete search history.

(56) References Cited

U.S. PATENT DOCUMENTS

2010/0098576 A1* 4/2010 Yoshizawa .............. C22C 38/16 420/92
2018/0169759 A1* 6/2018 Nakamura .......... H01F 1/15375
2018/0361474 A9 12/2018 Nakamura et al.
2019/0122793 A1 4/2019 Kwon et al.
2019/0279799 A1 9/2019 Hosono et al.

FOREIGN PATENT DOCUMENTS

CN 109778083 A * 5/2019
CN 110246650 A 9/2019
JP 2005-068451 A 3/2005
JP 2005-120473 A 5/2005
JP 2017-034091 A 2/2017
JP 2017-034105 A 2/2017
JP 6504730 B1 4/2019

OTHER PUBLICATIONS

Johnson; "Metallic Glasses", ASM Handbook, vol. 2: Properties and Selection: Nonferrous Alloys and Special-Purpose Materials, ASM International, 1990, pp. 804-821 (Year: 1990).*
CN-109778083-A: Espacenet English machine translation (Year: 2019).*

* cited by examiner

*Primary Examiner* — Adil A. Siddiqui
(74) *Attorney, Agent, or Firm* — Faegre Drinker Biddle & Reath LLP

(57) ABSTRACT

Provided is a soft magnetic alloy including a Fe-based nanocrystal and metallic glass. A differential scanning calorimetry curve of the soft magnetic alloy has a glass transition point Tg, a temperature rising rate of the soft magnetic alloy in measurement of the differential scanning calorimetry curve is 40 K/minute, and a temperature Tp of a maximum exothermic peak in the differential scanning calorimetry curve is higher than the Tg.

13 Claims, 5 Drawing Sheets

SOFT MAGNETIC METAL ALLOY AND ELECTRONIC COMPONENT

TECHNICAL FIELD

The present invention relates to a soft magnetic metal alloy and an electronic component including a soft magnetic metal alloy.

BACKGROUND

Electronic components such as inductors, transformers, and choke coils are widely used in power supply circuits of various electronic devices. The electronic components include a coil and a magnetic core disposed on an inner side of the coil. Recently, as a material for the magnetic core, a soft magnetic metal alloy is widely used instead of ferrite in the related art. The reason for this is because the soft magnetic alloy having higher saturation magnetization (saturation magnetic density) in comparison to ferrite is excellent in DC superimposition characteristics (DC superimposition permitting current is large), and is suitable for reduction in size of an electronic component (magnetic core). As an example of the soft magnetic alloy, Japanese Patent No. 6504730 discloses a soft magnetic alloy (soft magnetic alloy powder) consisting of Fe-based nanocrystal grains. The magnetic core is manufactured by compressing the soft magnetic alloy powder while heating the soft magnetic alloy powder. Japanese Unexamined Patent Publication No. 2017-34091 discloses a method for manufacturing a magnetic core using a Fe—B—Si—P—C—Cu-based amorphous powder. For convenience of explanation, a soft magnetic alloy including at least one of a Fe-based nanocrystal grain and a Fe-based amorphous alloy in the related art is noted as "nanocrystalline/amorphous alloy". Japanese Unexamined Patent Publication No. 2017-34105 discloses a method for manufacturing a magnetic core by using a mixed powder constituted by a first soft magnetic powder consisting of only a Fe-based nanocrystal or a Fe-based amorphous alloy, and a second soft magnetic powder consisting of only Fe-based metallic glass.

SUMMARY

A magnetic core is required to have high relative permeability. The relative permeability of the magnetic core increases in accordance with an increase in a filling rate of a soft magnetic alloy in the magnetic core. In other words, the higher a relative density of the soft magnetic alloy in the magnetic core is, the higher relative permeability of the magnetic core is. In addition, the filling rate of the soft magnetic alloy in the magnetic core has a great influence on DC superimposition characteristics. However, the nanocrystalline/amorphous alloy in the related art is harder than a crystal alloy, and plastic deformation of the nanocrystalline/amorphous alloy is less likely to occur. Accordingly, individual nanocrystalline/amorphous alloy particles in a process of molding a nanocrystalline/amorphous alloy powder when manufacturing the magnetic core are less likely to be deformed, and a void is likely to be formed between the nanocrystalline/amorphous alloy particles. That is, it is difficult for the nanocrystalline/amorphous alloy in the related art to have a high relative density. In a case where the nanocrystalline/amorphous alloy powder is compressed at a high pressure so as to increase a relative density of the nano crystalline/amorphous alloy, the individual nanocrystalline/amorphous alloy particle is more likely to be broken in comparison to a crystal metal. From the reasons, the nanocrystalline/amorphous alloy in the related art is hard to be compressed, and thus a magnetic core manufactured from the nanocrystalline/amorphous alloy is less likely to be densified and does not have sufficient soft magnetic properties.

In the method for manufacturing a magnetic core which is described in Japanese Unexamined Patent Publication No. 2017-34091, in order to raise the density of the magnetic core, the amorphous alloy powder in the related art is heated at a high temperature in a state in which the amorphous alloy powder in the related art is compressed. The high temperature is a temperature equal to or higher than a first crystallization initiation temperature $T_{x1}-50K$ and lower than a second crystallization initiation temperature $T_{x2}$. A phase transition of an amorphous alloy progresses due to heating of the amorphous alloy powder at a high temperature, and Fe-based nanocrystal grains are generated from the amorphous alloy. However, due to heat generation in accordance with the phase transition of the amorphous alloy, the Fe-based nanocrystal grains grow into coarse crystal grains having a high coercivity. Due to the reasons, in the method for manufacturing the magnetic core which is accompanied with the phase transition from the amorphous alloy into the Fe-based nanocrystal grains in the related art, it is difficult for the soft magnetic alloy to achieve both of a high relative density and a low coercivity.

In the method for manufacturing a magnetic core which is described in Japanese Unexamined Patent Publication No. 2017-34105, a mixed powder of a nanocrystal powder or an amorphous alloy powder (a first soft magnetic powder) and a metallic glass powder (a second soft magnetic powder) are compression-molded while heating the mixed powder near a glass transition point of the metallic glass to densify the magnetic core. However, typically, since the metallic glass has great magnetostriction of approximately $20\times10^{-6}$ to $40\times10^{-6}$, a coercivity of the magnetic core described in Japanese Unexamined Patent Publication No. 2017-34105 is likely to deteriorate due to a molding pressure.

An object of the invention is to provide a soft magnetic alloy capable of having a high relative density and a low coercivity, and an electronic component including the soft magnetic alloy.

According to an aspect of the invention, there is provided a soft magnetic alloy including a Fe-based nanocrystal. The soft magnetic alloy further includes a metallic glass, a differential scanning calorimetry (DSC) curve of the soft magnetic alloy has a glass transition point Tg, a temperature rising rate of the soft magnetic alloy in measurement of the differential scanning calorimetry curve is 40 K/minute, and a temperature Tp of a maximum exothermic peak in the differential scanning calorimetry curve is higher than the Tg.

The soft magnetic alloy may include an alloy expressed by the following Chemical Formula 1.

$$(Fe_{1-\alpha-\beta}X1_{\alpha}X2_{\beta})_{1-h}M_{a}B_{b}P_{c}Si_{d} \quad (1)$$

Provided that, h may be a+b+c+d, X1 may be at least one kind of element selected from the group consisting of Co and Ni, X2 may be at least one kind of element selected from the group consisting of Al, Mn, Ag, Zn, Sn, As, Sb, Cu, Cr, Bi, N, O, S, C and a rare earth element, M may be at least one kind of element selected from the group consisting of Nb, Hf, Zr, Ta, Mo, W, and V, a may be from 0.0 to 0.15, b may be from 0.0 to 0.20, c may be from 0.0 to 0.20, d may be from 0.0 to 0.20, α may be 0 or more, β may be 0 or more, α+β may be from 0 to 0.50, and 1-h may be more than 0.65 and 0.9 or less.

An average grain size of the Fe-based nanocrystal may be from 5 nm to 50 nm.

The differential scanning calorimetry curve may have a crystallization temperature Tx, a supercooled liquid region width ΔTx may be defined as Tx-Tg, and ΔTx may be from 10K to 200K.

The Tp may be from 600° C. to 800° C.

The soft magnetic alloy may be a powder.

Both the Fe-based nanocrystal and the metallic glass may exist in one soft magnetic alloy particle constituting the powder.

A nanocrystal structure consisting of the metallic glass and a plurality of the Fe-based nanocrystals dispersed in the metallic glass may be formed in one soft magnetic alloy particle constituting the powder.

The soft magnetic alloy may be a ribbon.

Both the Fe-based nanocrystal and the metallic glass may exist in the soft magnetic alloy consisting of one alloy composition.

According to another aspect of the invention, there is provided an electronic component including the soft magnetic alloy.

According to the invention, a soft magnetic alloy capable of having a high relative density and a low coercivity, and an electronic component including the soft magnetic alloy are provided.

DETAILED DESCRIPTION

Figure 1:
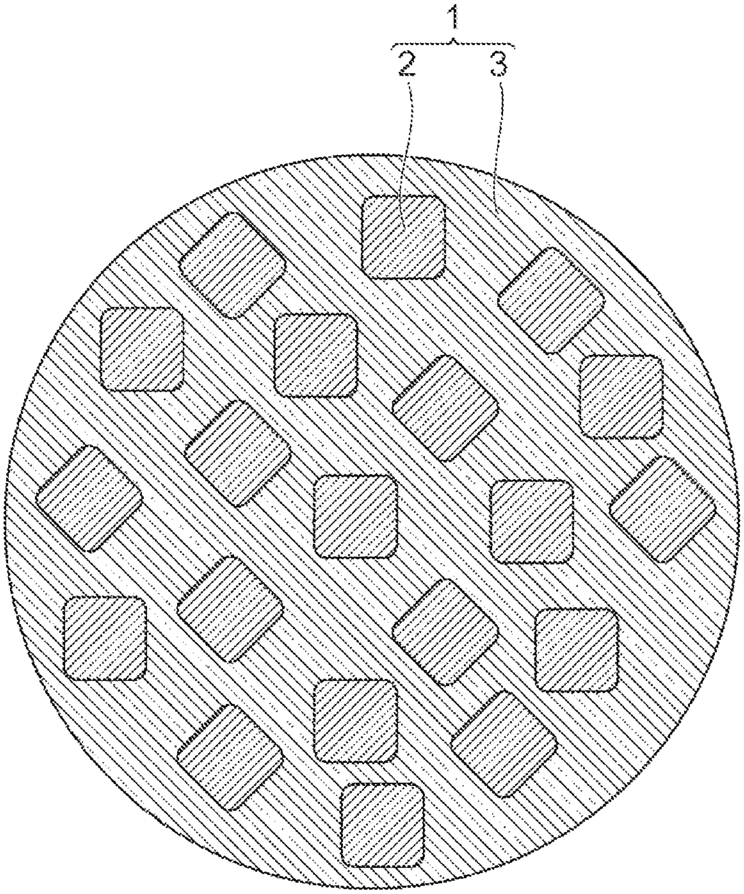
FIG. 1 is a schematic cross-sectional view of a soft magnetic alloy particle according to an embodiment of the invention.

Hereinafter, a preferred embodiment of the invention will be described with reference to the accompanying drawings. In the drawings, the same reference numeral will be given to an equivalent constituent element. The invention is not limited to the following embodiment.

(Soft Magnetic Alloy)

A soft magnetic alloy according to this embodiment includes a Fe-based nanocrystal and metallic glass. In other words, both of the Fe-based nanocrystal and the metallic glass exist in a soft magnetic alloy consisting of one alloy composition. A differential scanning calorimetry curve of the soft magnetic alloy according to this embodiment has a glass transition point Tg. A temperature rising rate of the soft magnetic alloy in measurement of the differential scanning calorimetry curve is 40 K/minute. A temperature Tp of a maximum exothermic peak in the differential scanning calorimetry curve is higher than the Tg. Details of the characteristics will be described later. The soft magnetic alloy according to this embodiment may be a powder (particle) or a ribbon. The powder (particle) consisting of the soft magnetic alloy may be manufactured by a gas atomizing method to be described later. The ribbon consisting of the soft magnetic alloy may be manufactured by a strip casting method to be described later. The following soft magnetic alloy powder and soft magnetic alloy particle may be manufactured by a gas atomizing method to be described later. The following soft magnetic alloy powder and soft magnetic alloy particle may be manufactured by pulverizing a ribbon composed of the soft magnetic alloy.

The soft magnetic alloy powder according to this embodiment includes a plurality of the soft magnetic alloy particles. The soft magnetic alloy powder may be referred to as the entirety of the plurality of soft magnetic alloy particles. As illustrated in FIG. 1, a soft magnetic alloy particle 1 includes at least one Fe-based nanocrystal 2 and metallic glass 3. In other words, both the Fe-based nanocrystal 2 and the metallic glass 3 exist in one piece of the soft magnetic alloy particle 1 constituting the soft magnetic alloy powder. The Fe-based nanocrystal 2 is a crystal consisting of a simple substance of Fe (for example, α-Fe) or an alloy including Fe, and having a grain size of approximately from 5 nm to 50 nm. The soft magnetic alloy particle 1 may include a plurality of the Fe-based nanocrystals 2. Each of the Fe-based nanocrystals 2 may have a body-centered cubic structure. The metallic glass 3 is an amorphous alloy having the glass transition point Tg. That is, the metallic glass 3 is different from a conventional amorphous soft magnetic alloy that does not have the glass transition point Tg. The soft magnetic alloy particle 1 may consist of only the Fe-based nanocrystal 2 and the metallic glass 3. The soft magnetic alloy particle 1 may include another component in addition to the Fe-based nanocrystal 2 and the metallic glass 3. For example, the soft magnetic alloy particle 1 may further include a small amount of amorphous alloy that does not have the glass transition point Tg as the other component as long as the effect of the invention is obtained. The soft magnetic alloy particle 1 may further include a small number of crystalline phases coarser than the Fe-based nanocrystal 2 as the other component as long as the effect of the invention is obtained. For example, the coarse crystalline phase is a crystal having a grain size or a crystallite diameter more than 50 nm. The soft magnetic alloy powder may further include a very small number of soft magnetic alloy particles which do not include the Fe-based nanocrystal 2 as long as the effect of the invention is obtained. The soft magnetic alloy powder may further include a very small number of soft magnetic alloy particles which do not include the metallic glass 3 as long as the effect of the invention is obtained. That is, the powder consisting of the Fe-based nanocrystal 2 and the metallic glass 3 may be mixed with a powder that does not include the Fe-based nanocrystal 2 and the metallic glass 3.

As described above, in the case of this embodiment, both the Fe-based nanocrystal 2 and the metallic glass 3 exist in the soft magnetic alloy consisting of one alloy composition. In a case where the soft magnetic alloy is a powder, both the Fe-based nanocrystal 2 and the metallic glass 3 exist in one piece of the soft magnetic alloy particle 1 constituting the soft magnetic alloy powder. Accordingly, the soft magnetic alloy according to this embodiment is completely different from a mixed powder constituted by a first soft magnetic powder consisting of only a Fe-based nanocrystal or a Fe-based amorphous alloy, and a second soft magnetic powder consisting of only Fe-based metallic glass. That is, the soft magnetic alloy according to this embodiment is completely different the mixed powder described in Japanese Unexamined Patent Publication No. 2017-34105, and a magnetic core manufactured from the soft magnetic alloy according to this embodiment is completely different form a magnetic core manufactured from the mixed powder described in Japanese Unexamined Patent Publication No. 2017-34105.

Figure 2:
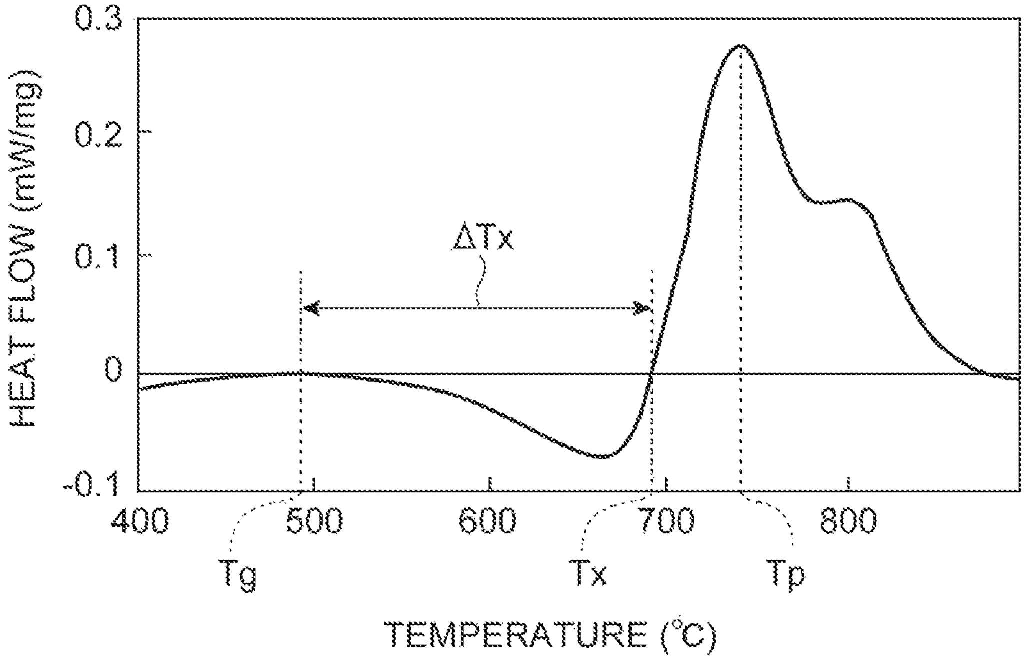
FIG. 2 is a differential scanning calorimetry curve of the soft magnetic alloy according to the embodiment of the present invention.

FIG. 2 is a differential scanning calorimetry curve (DSC curve) of the soft magnetic alloy according to this embodiment. The DSC curve is measured in a temperature rising process of the soft magnetic alloy. The horizontal axis of the DSC curve represents a temperature (unit: ° C.) of the soft magnetic alloy. The vertical axis of the DSC curve represents a heat flow (unit: mW/mg) per unit mass of the soft magnetic alloy. A positive heat flow represents an exotherm of the soft magnetic alloy. A negative heat flow represents an endotherm of the soft magnetic alloy. Appropriately, baseline correction of the DSC curve may be made.

The DSC curve of the soft magnetic alloy has a glass transition point Tg, a crystallization temperature Tx (crystallization initiation temperature), and a maximum exothermic peak. Tg is lower than Tx. A temperature Tp of the maximum exothermic peak in the DSC curve is higher than Tg, and Tp is higher than Tx. Tg may be an inflection point of the DSC curve at which a differential coefficient of the DSC curve turns from a positive value to a negative value. That is, the differential coefficient of the DSC curve at Tg may be zero. Tx may be a temperature at which an exotherm of the soft magnetic alloy initiates. The exothermic peak at Tp may be an exothermic peak that appears for the first time in the temperature rising process of the soft magnetic alloy. The DSC curve may further have an additional exothermic peak at a temperature higher than Tp.

At Tg, glass transition of the metallic glass 3 in the soft magnetic alloy particle 1 initiates, and an endotherm of the soft magnetic alloy powder according to the glass transition initiates. Due to the glass transition at Tg, the metallic glass 3 begins to be a supercooled liquid. At Tx, crystallization of the supercooled liquid (metallic glass 3) in the soft magnetic alloy particle 1 initiates, and an exotherm of the soft magnetic alloy powder according to the crystallization initiates. At Tp, the heat flow (the amount of the exothermic heat) according to the crystallization of the supercooled liquid (metallic glass 3) in the soft magnetic alloy particle 1 becomes maximum. A "supercooled liquid region" described below represents a region in which the temperature of the soft magnetic alloy is equal to or higher than Tg and lower than Tx.

A temperature rising rate of the soft magnetic alloy in the measurement of the DSC curve is 40 K/minute. In a case where the temperature rising rate of the soft magnetic alloy is less than 40 K/minute, the crystallization of the metallic glass 3 is likely to initiate at a low temperature. That is, in a case where the temperature rising rate is less than 40 K/minute, the exothermic peak according to the crystallization of the metallic glass 3 is likely to appear at a low temperature region of the DSC curve, and the exothermic peak becomes broad in a direction of the horizontal axis (temperature) of the DSC curve. As a result, it is difficult to accurately distinguish Tg (inflection point of the DSC curve) and the exothermic peak.

In a supercooled liquid region, a part or the entirety of the metallic glass 3 in the soft magnetic alloy particle 1 becomes a supercooled liquid, and the soft magnetic alloy particle 1 becomes soft. In other words, in the supercooled liquid region, the soft magnetic alloy particle 1 including the metallic glass 3 is softer than the soft magnetic alloy particle consisting of only the Fe-based nanocrystal in the related art. Accordingly, when the soft magnetic alloy powder is compressed while being heated in the supercooled liquid region, individual soft magnetic alloy particle 1 is likely to be deformed. That is, in the supercooled liquid region, plastic deformation of the soft magnetic alloy particle 1 is likely to occur. In accordance with the plastic deformation of the soft magnetic alloy particle 1, a void between a plurality of the soft magnetic alloy particles 1 decreases, and the soft magnetic alloy powder is further densified. For the above-described reasons, the soft magnetic alloy powder according to this embodiment can have a high relative density. Accordingly, when a magnetic core is manufactured from the soft magnetic alloy powder according to this embodiment, a filling rate of the soft magnetic alloy powder in the magnetic core increases, and relative permeability of the magnetic core increases. In addition, in the supercooled liquid region, phase transition from the metallic glass 3 to the Fe-based nanocrystal 2 is less likely to occur, and an exotherm according to the phase transition is less likely to occur, and thus it is possible to easily control the temperature of the soft magnetic alloy powder in a compression process. Accordingly, when the soft magnetic alloy powder is compressed in the supercooled liquid region, grain growth of the Fe-based nanocrystal 2 caused by the exotherm according to the phase transition is suppressed, and the coercivity of the soft magnetic alloy powder is likely to be maintained at a low value. Note that, in a case where the soft magnetic alloy ribbon is processed in the supercooled liquid region, the ribbon becomes soft, and thus a shaping process of the ribbon such as elongation, stretching, and lamination become easy.

In a case where the soft magnetic alloy powder is compressed at a temperature equal to or higher than Tx (that is, the temperature of the soft magnetic alloy powder is excessively high), crystallization of a supercooled liquid (metallic glass 3) is likely to progress in a compression process. That is, phase transition from the metallic glass 3 to the Fe-based nanocrystal 2 is likely to occur. Due to an exotherm according to the phase transition, grain growth of the Fe-based nanocrystal 2 in the soft magnetic alloy particle 1 may excessively progress, or a metal compound (for example, iron boride) or the like, which is less likely to contribute to soft magnetic properties, precipitates in the soft magnetic alloy particle 1. For the reasons, the soft magnetic properties of the soft magnetic alloy powder are likely to deteriorate, and particularly, the coercivity is likely to increase.

Since the soft magnetic alloy powder according to this embodiment includes not only the metallic glass but also the Fe-based nanocrystal, the soft magnetic alloy powder according to this embodiment is superior to a conventional soft magnetic alloy powder consisting of only the metallic glass or the amorphous alloy in the soft magnetic properties. For example, the soft magnetic alloy according to this embodiment is likely to have higher saturation magnetization and a lower coercivity in comparison to the conventional soft magnetic alloy powder.

A supercooled liquid region width $\Delta Tx$ may be defined as $Tx-Tg$. For example, $\Delta Tx$ may be from 10K to 200K. When $\Delta Tx$ is from 10K to 200K, the soft magnetic alloy is likely to have excellent soft magnetic properties. As $\Delta Tx$ is smaller, a temperature range in which a part or the entirety of the metallic glass in the soft magnetic alloy is a supercooled liquid is narrower. Accordingly, as $\Delta Tx$ is smaller, a temperature range in which the soft magnetic alloy is likely to be deformed is narrower. In other words, as $\Delta Tx$ is smaller, a temperature range of the soft magnetic alloy powder for increasing a relative density of the soft magnetic alloy powder through compression of the soft magnetic alloy powder is narrower. Accordingly, manufacturing conditions of the magnetic core (molding conditions of the soft magnetic alloy powder) are limited.

For example, Tg may be 350° C. or higher and lower than 600° C. Tx may be from (Tg+10)° C. to (Tg+200)° C. Tp may be from 600° C. to 800° C. In a case where Tp is excessively low, crystallization (phase transition) of the supercooled liquid (metallic glass 3) is likely to progress in a compression process of the soft magnetic alloy accompanied with heating. Due to an exotherm according to crystallization of the supercooled liquid, grain growth of the Fe-based nanocrystal in the soft magnetic alloy is likely to excessively progress. In addition, due to crystallization of the supercooled liquid, a metal compound (for example, iron boride) or the like, which is less likely to contribute to the soft magnetic properties, is likely to be precipitate in the soft magnetic alloy. For the reasons, the soft magnetic properties of the soft magnetic alloy are likely to deteriorate, and particularly, the coercivity of the soft magnetic alloy is likely to increase. Tg, Tx, and Tp may be controlled on the basis of a composition of the soft magnetic alloy. Tg, Tx, and Tp may be controlled on the basis of various conditions in a gas atomizing method and a heat treatment subsequent to the method. Tg, Tx, and Tp may be controlled on the basis of various conditions in a strip casting method and a heat treatment subsequent to the method.

Since the soft magnetic alloy is likely to have excellent soft magnetic properties, the soft magnetic alloy may have a nanocrystal structure consisting of the metallic glass and a plurality of the Fe-based nanocrystals dispersed in the metallic glass. In a case where the soft magnetic alloy has the nanocrystal structure, the saturation magnetization of the soft magnetic alloy is likely to increase, and the coercivity of the soft magnetic alloy is likely to decrease.

For example, an average grain size of the Fe-based nanocrystal 2 is from 5 nm to 50 nm, or from 5 nm to 30 nm. The average grain size of the Fe-based nanocrystal 2 may be referred to as an average crystallite diameter of the Fe-based nanocrystal 2. In a case where the average grain size of the Fe-based nanocrystal 2 is within the above-described range, the soft magnetic alloy powder is likely to have excellent soft magnetic properties. The average grain size of the Fe-based nanocrystal 2 may be an average value of grain sizes (an equivalent circle diameter) of all Fe-based nanocrystals 2 observed on cross-sections of a plurality of (for example, twenty) soft magnetic alloy particles 1. The cross-sections of the soft magnetic alloy particles 1 may be observed by a scanning transmission electronic microscope (STEM) or a transmission electronic microscope (TEM). A diffraction X-ray peak derived from the Fe-based nanocrystal 2 in the soft magnetic alloy powder may be measured by a powder X-ray diffraction method, or an average crystallite diameter of the Fe-based nanocrystal 2 may be calculated from a full width at half maximum of the diffraction X-ray peak on the basis of Scherrer formula.

At least one of the Fe-based nanocrystal 2 and the metallic glass 3 may include an alloy including at least one kind of element selected from the group consisting of niobium (Nb), hafnium (Hf), zirconium (Zr), tantalum (Ta), molybdenum (Mo), tungsten (W), vanadium (V), boron (B), phosphorus (P), silicon (Si), titanium (Ti), cobalt (Co), nickel (Ni), aluminum (Al), manganese (Mn), silver (Ag), zinc (Zn), tin (Sn), arsenic (As), antimony (Sb), copper (Cu), chromium (Cr), bismuth (Bi), nitrogen (N), oxygen (O), sulfur (S), carbon (C), and a rare earth element in addition to iron (Fe). The metallic glass 3 is likely to include at least one metalloid selected from the group consisting of B, C, Si, P, As, and Sb. The soft magnetic alloy particles 1 may consist of only the above-described alloy.

The soft magnetic alloy may be expressed by the following Chemical Formula 1. The soft magnetic alloy may consist of only the alloy expressed by the following Chemical Formula 1. The alloy included in the individual soft magnetic alloy particle 1 may be expressed by the following Chemical Formula 1. The soft magnetic alloy particle 1 may consist of only the alloy expressed by the following Chemical Formula 1.

$$(Fe_{1-\alpha-\beta}X1_{\alpha}X2_{\beta})_{1-h}M_aB_bP_cSi_d \quad (1)$$

B in Chemical Formula 1 described above is boron. P in Chemical Formula 1 described above is phosphorous. Si in Chemical Formula 1 described above is silicon. h in Chemical Formula 1 described above is equal to a+b+c+d. h is more than 0 and less than 1. A unit of each of α, β, a, b, c, d, and h in Chemical Formula 1 described above is mol.

M in Chemical Formula 1 described above is at least one element selected from the group consisting of Nb, Hf, Zr, Ta, Mo, W, and V.

X1 in Chemical Formula 1 described above is at least one kind of element selected from the group consisting of Co and Ni.

X2 in Chemical Formula 1 described above is at least one kind of element selected from the group consisting of Al, Mn, Ag, Zn, Sn, As, Sb, Cu, Cr, Bi, N, O, S, C, and a rare earth element. The rare earth element is at least one kind of element selected from the group consisting of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

a in Chemical Formula 1 described above may satisfy the following inequality.

$$0 \le a \le 0.150,$$

$$0.030 \le a \le 0.150,$$

$$0.040 \le a \le 0.100, \text{ or}$$

$$0.050 \le a \le 0.080.$$

In a case where a is excessively small, in a process of manufacturing the soft magnetic alloy, there is a tendency that a coarse crystal having a grain size greater than 50 nm is likely to precipitate in the soft magnetic alloy, and a fine Fe-based nanocrystal is less likely to precipitate in the soft magnetic alloy. As a result, the coercivity of the soft magnetic alloy is likely to increase. In a case where a is excessively large, saturation magnetization of the soft magnetic alloy is likely to decrease.

b in Chemical Formula 1 described above may satisfy the following inequality.

$$0 \le b \le 0.20$$

$$0.030 \le b \le 0.20,$$

$$0.060 \le b \le 0.15, \text{ or}$$

$$0.080 \le b \le 0.12.$$

In a case where b is excessively small, in a process of manufacturing the soft magnetic alloy, a coarse crystal having a grain size greater than 50 nm is likely to precipitate in the soft magnetic alloy, and a fine Fe-based nanocrystal is less likely to precipitate in the soft magnetic alloy. As a result, the coercivity of the soft magnetic alloy is likely to increase. In a case where b is excessively large, saturation magnetization of the soft magnetic alloy is likely to decrease.

c in Chemical Formula 1 described above may satisfy the following inequality.

$$0 \leq c \leq 0.20,$$

$$0.01 \leq c \leq 0.20,$$

$$0.01 \leq c \leq 0.15, \text{ or}$$

$$0.01 \leq c \leq 0.05.$$

In a case where c is from 0.01 to 0.05, electric resistivity of the soft magnetic alloy is likely to increase, and the coercivity is likely to decrease. In a case where c is excessively small, the coercivity is likely to increase. In a case where c is excessively large, the saturation magnetization of the soft magnetic alloy is likely to decrease.

d in Chemical Formula 1 described above may satisfy the following inequality.

$$0 \leq d \leq 0.20,$$

$$0.04 \leq d \leq 0.20, \text{ or}$$

$$0.04 \leq d \leq 0.150.$$

In a case where d is within the above-described range, the coercivity of the soft magnetic alloy is likely to decrease. In a case where d is excessively large, the coercivity of the soft magnetic alloy is likely to increase.

1-h in Chemical Formula 1 described above may satisfy the following inequality.

$$0.65 \leq 1\text{-}h \leq 0.90, \text{ or}$$

$$0.680 \leq 1\text{-}h \leq 0.880.$$

In a case where 1-h satisfies $0.680 \leq 1\text{-h} \leq 0.880$, in a process of manufacturing the soft magnetic alloy, a coarse crystal having a grain size greater than 50 nm is less likely to precipitate in the soft magnetic alloy.

$\alpha$ and h in Chemical Formula 1 described above may satisfy the following inequality.

$$0 \leq \alpha(1\text{-}h) \leq 0.40, \text{ or}$$

$$0.01 \leq \alpha(1\text{-}h) \leq 0.40.$$

$\beta$ and h in Chemical Formula 1 described above may satisfy the following inequality.

$$0 \leq \beta(1\text{-}h) \leq 0.050, \text{ or}$$

$$0.001 \leq \beta(1\text{-}h) \leq 0.050.$$

$\alpha$ in Chemical Formula 1 described above may be 0 or more, $\beta$ in Chemical Formula 1 described above may be 0 or more, and $\alpha+\beta$ in Chemical Formula 1 described above may satisfy $0 \leq \alpha+\beta \leq 0.50$. In a case where $\alpha+\beta$ is excessively large, a fine Fe-based nanocrystal is less likely to precipitate in the soft magnetic alloy.

A part or the entirety of the surface of the soft magnetic alloy particle 1 may be covered with a coating part having an electrical insulation property. When a plurality of the soft magnetic alloy particles 1 are in contact with each other through the coating part having an electrical insulation property, electrical conduction between the soft magnetic alloy particles 1 is suppressed, and a withstand voltage of the soft magnetic alloy powder increases. A part or the entirety of the soft magnetic alloy particles 1 included in the soft magnetic alloy powder may be covered with the coating part.

The coating part may be formed through oxidization of the surface of each of the soft magnetic alloy particles 1. That is, the coating part may be an oxide including an element common to the soft magnetic alloy particle 1. The coating part may consist of only a resin. When the soft magnetic alloy particle 1 is covered with the coating part, an electrical insulation property of a magnetic core formed from the soft magnetic alloy particle 1 is likely to be improved, and a withstand voltage of the magnetic core is likely to increase. The coating part may consist of a plurality of coating layers having compositions different from each other, and the plurality of coating layers may be stacked in a direction orthogonal to the surface of the soft magnetic alloy particle 1. The coating part may be only layer having a uniform composition.

A composition of the coating part is not limited as long as the coating part electrically insulates the soft magnetic alloy particles 1. For example, the coating part may include at least one kind of element selected from the group consisting of iron (Fe), niobium (Nb), hafnium (Hf), zirconium (Zr), tantalum (Ta), molybdenum (Mo), tungsten (W), vanadium (V), boron (B), phosphorus (P), silicon (Si), titanium (Ti), cobalt (Co), nickel (Ni), aluminum (Al), manganese (Mn), silver (Ag), zinc (Zn), tin (Sn), arsenic (As), antimony (Sb), copper (Cu), chromium (Cr), bismuth (Bi), nitrogen (N), oxygen (O), sulfur (S), carbon (C), a rare earth element, lithium (Li), sodium (Na), potassium (K), beryllium (Be), magnesium (Mg), calcium (Ca), strontium (Sr), barium (Ba), indium (In), germanium (Ge), lead (Pb), selenium (Se), tellurium (Te), fluorine (F), chlorine (Cl), and bromine (Br).

For example, a median diameter (D50) of the soft magnetic alloy powder may be from 0.3 μm to 100 μm. D50 may be specified on the basis of a number-based particle size distribution of the soft magnetic alloy powder. The soft magnetic alloy powder may be a mixture of two or more kinds of alloy powders different in a particle size or a particle size distribution. The particle size and the particle size distribution of the soft magnetic alloy powder may be adjusted by sieving classification, airflow classification, or the like. For example, the particle size and the particle size distribution of the soft magnetic alloy powder may be measured by a laser diffraction scattering method. From the viewpoint that a relative density of the soft magnetic alloy powder is likely to increase, a shape of the soft magnetic alloy particle 1 may be approximately spherical. However, the shape of the soft magnetic alloy particle 1 is not limited. The soft magnetic alloy particle 1 may have a flake shape.

The relative density (unit: none) of the soft magnetic alloy powder may be defined as db/Dt or db'/Dt. db is a volume density of the soft magnetic alloy powder. db' is a volume density of a magnetic core manufactured from the soft magnetic alloy powder. Dt is a theoretical density of the soft magnetic alloy powder. For example, the unit of each of the volume density and the theoretical density may be $kg/m^3$. The volume density db of the soft magnetic alloy powder may be a value obtained by dividing the mass of a molded body manufactured from only the soft magnetic alloy powder by a volume of the molded body. The volume density db' of the magnetic core may be value obtained by dividing the mass of the magnetic core by a volume of the magnetic core. The theoretical density Dt of the soft magnetic alloy powder may be measured by Archimedes method.

A crystal structure and a composition of each of the Fe-based nanocrystal 2 and the metallic glass 3 may be analyzed by a method such as a scanning transmission electron microscope (STEM), a transmission electron microscope (TEM), energy dispersive X-ray spectroscopy (EDS), electron energy loss spectroscopy (EELS), fast Fourier transform (FFT) analysis of a TEM image, a powder X-ray diffraction (XRD) method, and inductively coupled plasma atomic emission spectroscopy (ICP-AES).

(Method for Manufacturing Soft Magnetic Alloy Powder)

The soft magnetic alloy according to this embodiment may be manufactured by a gas atomizing method to be described later. The soft magnetic alloy according to this embodiment may be manufactured by a strip casting method to be described later.

<Gas Atomizing Method>

In the gas atomizing method (new gas atomizing method), a metal raw material is melted to form a molten metal, a high-pressure gas is sprayed to the molten metal to form liquid droplets, and the liquid droplets are rapidly cooled with cooling water to form metal fine particles (fine powders). After the gas atomizing method, a heat treatment on the fine powders is further performed to form a soft magnetic alloy powder.

Figure 3:
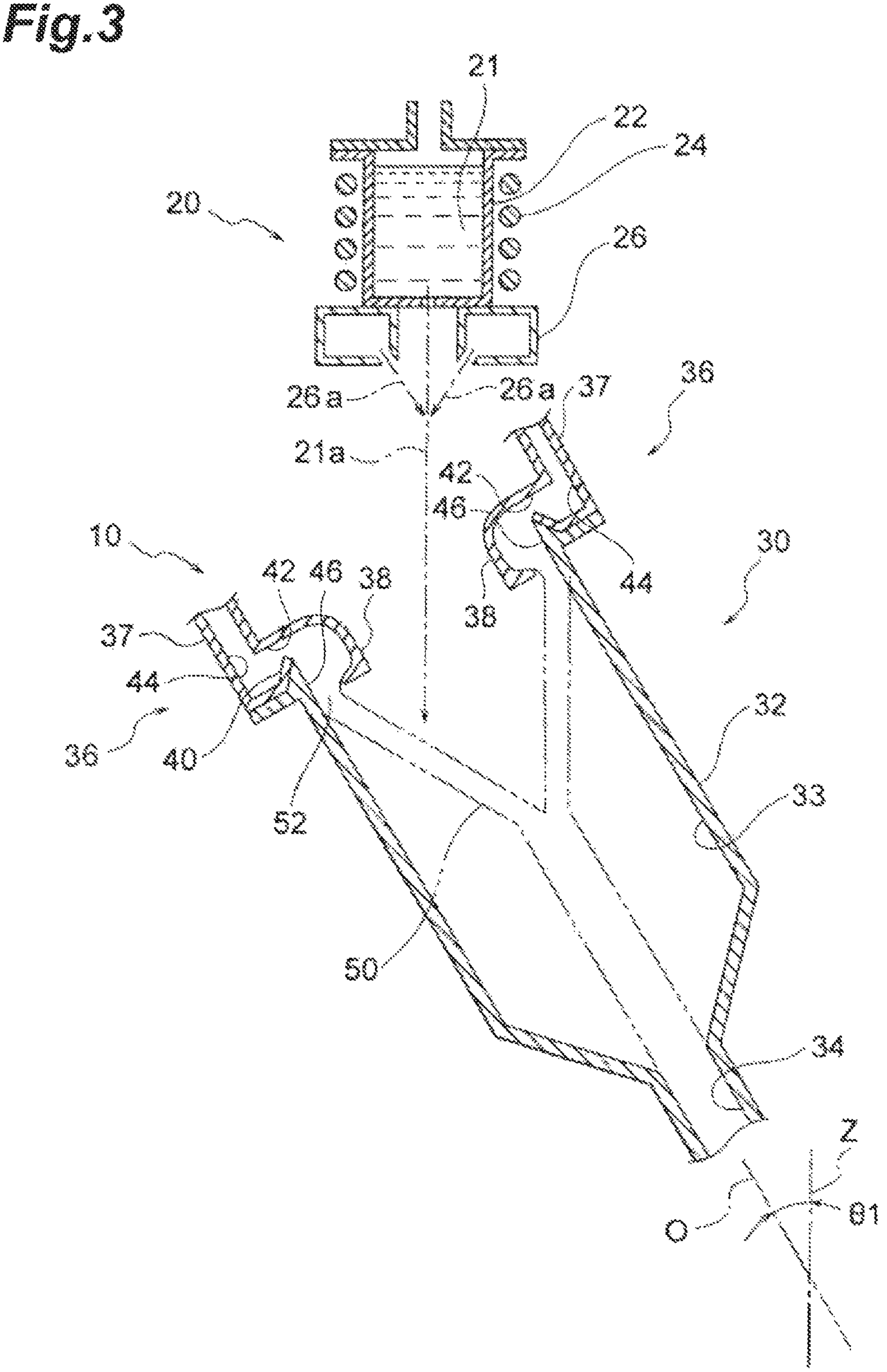
FIG. 3 is a schematic cross-sectional view of a gas atomizing apparatus that is used in manufacturing of a soft magnetic alloy powder.

The gas atomizing method may be carried out by using a gas atomizing apparatus 10 illustrated in FIG. 3. The gas atomizing apparatus 10 includes a supply unit 20 and a cooling unit 30 disposed on a downward side of the supply unit 20. A Z-axis direction in FIG. 3 is a vertical direction.

The supply unit 20 includes a heat-resistant container 22, and a coil 24 (heating device) disposed at the periphery of the container 22. As a raw material of the soft magnetic alloy powder, a metal raw material is contained in the container 22.

A composition of the metal raw material may be adjusted to match the composition of the soft magnetic alloy powder. For example, the composition of the metal raw material may be a composition expressed by Chemical Formula 1 described above. A mixture of a plurality of kinds of metal raw materials may be used. In a case where the plurality of kinds of metal raw materials are used, respective metal raw materials may be weighed so that a composition of the entirety of the plurality of kinds of metal raw materials matches Chemical Formula 1 described above. The metal raw materials may include inevitable impurities. A content of the inevitable impurities in all of the metal raw materials may be from 0% by mass to 0.1% by mass. A form of the metal raw material may be, for example, an ingot, a chunk (lump), or a shot (particle).

The metal raw material in the container 22 is heated by the coil 24. As a result, the metal raw material in the container 22 is melted, and becomes a molten metal 21. A temperature of the molten metal 21 may be adjusted in correspondence with a melting point of metals included in the metal raw material. For example, the temperature of the molten metal 21 may be from 1200° C. to 1600° C. When a vapor pressure in the container 22 is adjusted to 4 hPa or lower, a metallic glass phase is likely to be stably obtained.

The molten metal 21 is supplied dropwise from an ejection port of the container 22 toward the cooling unit 30. In addition, a high-pressure gas 26*a* is sprayed from a gas nozzle 26 to the molten metal 21. As a result, a plurality of fine liquid droplets 21*a* are formed from the molten metal 21. The liquid droplets 21*a* move to the inside of a tubular body 32 of the cooling unit 30 along the high-pressure gas 26*a*. For example, an atmosphere inside the tubular body 32 may be vacuum.

The high-pressure gas sprayed to the molten metal 21 may be, for example, an inert gas or a reducing gas. For example, the inert gas may be at least one kind of gas selected from the group consisting of nitrogen ($N_2$), argon (Ar), and helium (He). For example, the reducing gas may be an ammonia decomposition gas. In a case where the molten metal 21 consists of a metal that is not easily oxidized, the high-pressure gas may be air.

When the cooling water is supplied from a cooling water introduction part 36 to the inside of the tubular body 32, a water flow 50 is formed inside the tubular body 32. A shape of the water flow 50 is an inverted cone. When the liquid droplet 21*a* collides with the inverted conical water flow 50, the liquid droplet 21*a* is decomposed into finer liquid droplets. The fine liquid droplets are rapidly cooled by the water flow 50, and are solidified.

Due to the rapid cooling of the liquid droplets 21*a* as described above, a fine powder consisting of a plurality of metal fine particles is formed. A composition of the fine powder approximately matches a composition (for example, Chemical Formula 1 described above) of the entirety of raw material metals.

As described above, since the inverted conical water flow 50 is formed inside the tubular body 32, movement time of the liquid droplet 21*a* in the air is further shortened in comparison to a case where a water flow is formed along an inner wall of the tubular body 32. That is, time required for the liquid droplet 21*a* to reach the water flow 50 from the container 22 is shortened. Due to shortening of the movement time of the liquid droplet 21*a* in the air, rapid cooling of the liquid droplet 21*a* is promoted, and thus an amorphous alloy is likely to be formed in the obtained metal fine particles. In addition, due to shortening of the movement time of the liquid droplet 21*a* in the air, oxidization of the liquid droplet 21*a* during movement is suppressed. As a result, the liquid droplet 21*a* is likely to be decomposed into fine liquid droplets in the water flow 50, and the quality of a finally obtained soft magnetic alloy powder is improved.

In a case where the water flow 50 is a cylindrical water flow along an inner wall of the tubular body 32 instead of the inverted conical shape, it is difficult for the soft magnetic alloy particle to include the metallic glass, and thus it is difficult for the differential scanning calorimetry curve of the soft magnetic alloy powder to have the glass transition point Tg. The reason for this is not clear, but the following mechanism is assumed.

In a case where the water flow 50 has the inverted conical shape, the liquid droplet 21*a* instantaneously passes through the thin water flow 50 constituting a side wall of an inverted cone, and thus only a surface of the liquid droplet 21*a* is likely to be rapidly cooled. As a result, a Fe atom cluster that is a precursor of the Fe-based nanocrystal is formed inside the liquid droplet 21*a*, and a plurality of the Fe atom clusters are unevenly dispersed in a metalloid contributing to formation of the metallic glass. That is, an amorphous alloy having a locally varying composition is formed. As a result, the Fe-based nanocrystal 2 is preferentially formed from the Fe atom cluster due to a heat treatment on metal fine particles (fine powder) to be described later, and the metallic glass 3 (an amorphous phase having Tg) is formed in a region in which the metalloid element is further concentrated. That is, a nanocrystal structure consisting of the metallic glass 3 and a plurality of the Fe-based nanocrystals 2 dispersed in the metallic glass 3 is formed.

In a case where the water flow 50 is a cylindrical water flow along the inner wall of the tubular body 32 instead of the inverted conical shape, the entirety of the liquid droplets 21*a* is likely to be received in the cylindrical water flow, and the entirety of the liquid droplets 21*a* are likely to be uniformly cooled. As a result, the above-described mechanism is less likely to occur.

However, a mechanism in which the Fe-based nanocrystal 2 and the metallic glass 3 are formed is not limited to the above-described mechanism.

An angle between a central axial line O of the tubular body 32 and the Z-axis direction is expressed as θ1. For example, θ1 may be from 0° to 45°. When θ1 is from 0° to 45°, the liquid droplet 21*a* easily comes into contact with the inverted conical water flow 50.

A discharge part 34 is provided on a downward side of the tubular body 32. The cooling water including the fine powder is discharged from the discharge part 34 to the outside of the tubular body 32. The cooling water discharged from the discharge part 34 may be contained, for example, in a storage tank. In the storage tank, the fine powder settles to the bottom of the storage tank due to weight of the fine powder. As a result, the fine powder is separated from the cooling water.

Amorphousness and a shape of the metal fine particles may be controlled by a temperature of the cooling water supplied to the cooling unit 30 (tubular body 32), a shape of the water flow 50, a flow rate of the cooling water, or a flow amount of the cooling water.

Figure 4:
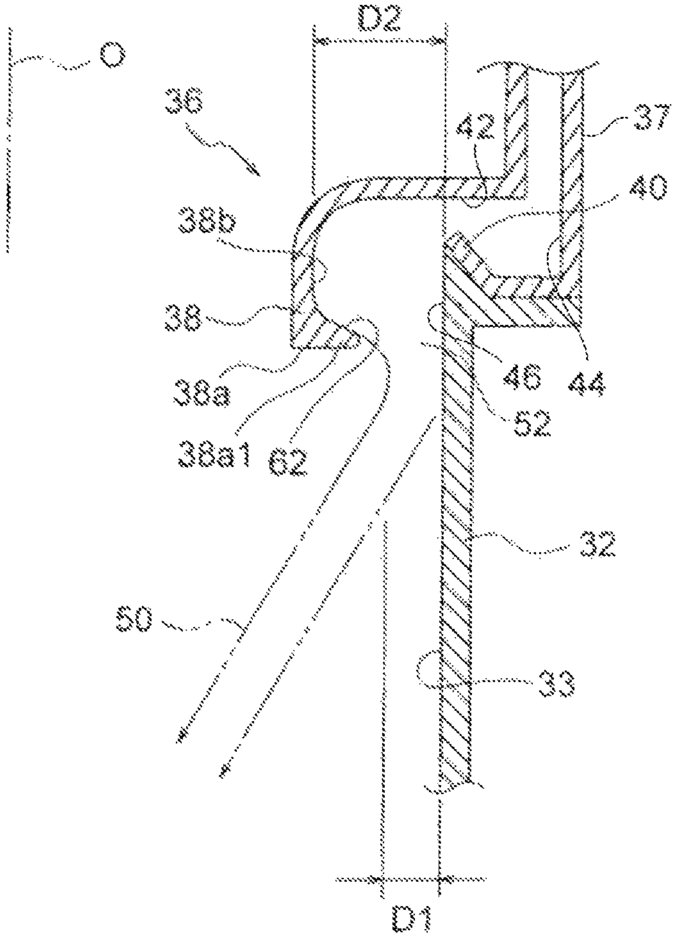
FIG. 4 is a view illustrating an enlarged cross-section of a part (a cooling water introduction part) of the apparatus illustrated in FIG. 3.

FIG. 4 is an enlarged view of the cooling water introduction part 36 illustrated in FIG. 3. The inverted conical water flow 50 is formed inside the tubular body 32, and thus a flow of the cooling water is controlled by a structure of the introduction part 36.

As illustrated in FIG. 4, a space surrounded by a frame 38 is partitioned into an outer part 44 and an inner part 46 by a boundary part 40. The outer part 44 (outer space part) is located on an outer side of the tubular body 32. The inner part 46 (inner space part) is located on an inner side of the tubular body 32. The outer part 44 and the inner part 46 communicate with each other through a passage part 42. One or a plurality of nozzles 37 communicate with the outer part 44. The cooling water is supplied from the nozzle 37 to the outer part 44, and flows from the outer part 44 to the inner part 46 through the passage part 42. An ejection part 52 is formed on a downward side of the inner part 46. The cooling water in the inner part 46 is supplied from the ejection part 52 to the inside of the tubular body 32.

An outer peripheral surface of the frame 38 is a flow passage surface 38*b* that guides a flow of the cooling water in the inner part 46. A convex part 38*a*1 is formed in a lower end 38*a* of the frame 38. The convex part 38*a*1 protrudes toward an inner wall 33 of the tubular body 32. A surface of the convex part 38*a*1 facing the inner part 46 is a deflection surface 62. The deflection surface 62 is continuous to a flow passage surface 38*b*, and changes a direction of the cooling water passing through the flow passage surface 38*b*. A ring-shaped gap is formed between a tip end of the convex part 38*a*1 and the inner wall 33 of the tubular body 32. The ring-shaped gap corresponds to the ejection part 52 of the cooling water.

The convex part 38*a*1 of the frame 38 protrudes toward the inner wall 33 of the tubular body 32, and a width D1 of the ejection part 52 is narrower than a width D2 of the inner part 46. Due to this structure, the cooling water passing through the flow passage surface 38*b* can be directed by the deflection surface 62. As a result, the cooling water collides with the inner wall 33 of the tubular body 32, and is reflected to an inner side of the tubular body 32.

Since the cooling water passes through the above-described flow passage, the cooling water supplied from the ejection part 52 to the inside of the tubular body 32 becomes the inverted conical water flow 50. In a case where D1 equals to D2, the cooling water supplied from the ejection part 52 to the inside of the tubular body 32 flows in parallel to the inner wall 33 of the tubular body 32, and thus the inverted conical water flow 50 is less likely to be formed.

From the viewpoint that the inverted conical water flow 50 is likely to be formed, D1/D2 may be from 1/10 to 2/3, and preferably from 1/10 to 1/2.

The cooling water supplied from the ejection part 52 to the inside of the tubular body 32 flows straightly toward the central axial line O of the tubular body 32. The inverted conical water flow 50 may be a water flow that circulates around the central axial line O without flowing straightly.

In the gas atomizing method, a particle size and a particle size distribution of the fine powder may be controlled by a pressure of the high-pressure gas 26*a*, a dropping amount of the molten metal 21 per unit time, a pressure of the water flow 50, or the like. The particle size and the particle size distribution of the fine powder approximately match the particle size and the particle size distribution of the soft magnetic alloy powder.

A DSC curve of the fine powder (metal fine particles) obtained by the above-described gas atomizing method has an exothermic peak caused by generation of the nanocrystal. The exothermic peak is likely to appear in a low temperature region of the DSC curve, and the exothermic peak becomes broad in a horizontal (temperature) direction of the DSC curve. As a result, it is difficult to accurately identify the exothermic peak caused by generation of the nanocrystal and the inflection point of the DSC curve which is caused by glass transition. That is, in a fine powder before the following heat treatment, generation and growth of the nanocrystal are likely to occur in a low temperature approximately equal to Tg of the soft magnetic alloy powder obtained by the heat treatment. Accordingly, in the DSC curve of the fine powder before the heat treatment, it is difficult to detect an inflection point (Tg) lower than the temperature Tp of the exothermic peak. A metalloid element of the fine powder is concentrated by the following heat treatment on the fine powder, and the soft magnetic alloy particle including the Fe-based nanocrystal and the metallic glass is obtained, and the DSC curve of the soft magnetic alloy powder can have Tg.

After the gas atomizing method, the heat treatment on the fine powder (metal fine particles) is performed in a non-oxidizing atmosphere. The non-oxidizing atmosphere may be an inert gas. For example, the inert gas may be at least one kind of gas selected from the group consisting of $N_2$, Ar, and He. A temperature (a heat treatment temperature) of the fine powder in the heat treatment may be, for example, from 400° C. to 650° C. When the heat treatment temperature is controlled to 400° C. or higher, the Fe-based nanocrystal and the metallic glass are likely to be formed in the metal fine particles. In a case where the heat treatment temperature is excessively high, grain growth of the Fe-based nanocrystal and crystallization of the metallic glass are likely to progress during the heat treatment. As a result, the soft magnetic alloy powder according to this embodiment is less likely to be obtained. Time (heat treatment time) for which the temperature of the fine powder is maintained at the heat treatment temperature may be, for example, from 0.1 hour to 10 hours. In a case where the heat treatment time is excessively short, the Fe-based nanocrystal and the metallic glass are less likely to be formed in the metal fine particles. In a case where the heat treatment time is excessively long, grain growth of the Fe-based nanocrystal and crystallization of the metallic glass are likely to progress during the heat treatment. As a result, the soft magnetic alloy powder according to this embodiment is less likely to be obtained. A temperature rising rate of the fine powder in the heat treatment is not limited and may be changed depending on a furnace that is used in the heat treatment. In the heat treatment, it is preferable that the temperature of the fine powder is rapidly raised. For example, in a case where an infrared image furnace is used in the heat treatment, the temperature rising rate of the fine powder in the heat treatment may be from 1° C./minute to 6000° C./minute. The temperature rising rate of the fine powder in the heat treatment is a temperature rising rate until the temperature of the fine powder reaches the heat treatment temperature from room temperature.

The soft magnetic alloy powder according to this embodiment is completed by the new gas atomizing method and the heat treatment described above.

After the heat treatment, a surface of each soft magnetic alloy particle may be covered with the coating part. For example, a method for forming the coating part may be at least one kind of method selected from the group consisting of a powder sputtering method, a sol-gel method, a mechanochemical coating method, a phosphate treatment method, an immersing method, and a heat treatment method. For example, in a case where the coating part consists of a plurality of coating layers having compositions different from each other, the coating part may be formed by a combination of a plurality of methods.

An oxidized part covering each soft magnetic alloy particle may be formed by oxidizing the surface of the soft magnetic alloy particle at a temperature lower than Tx or lower than Tg.

<Strip Casting Method>

Figure 5:
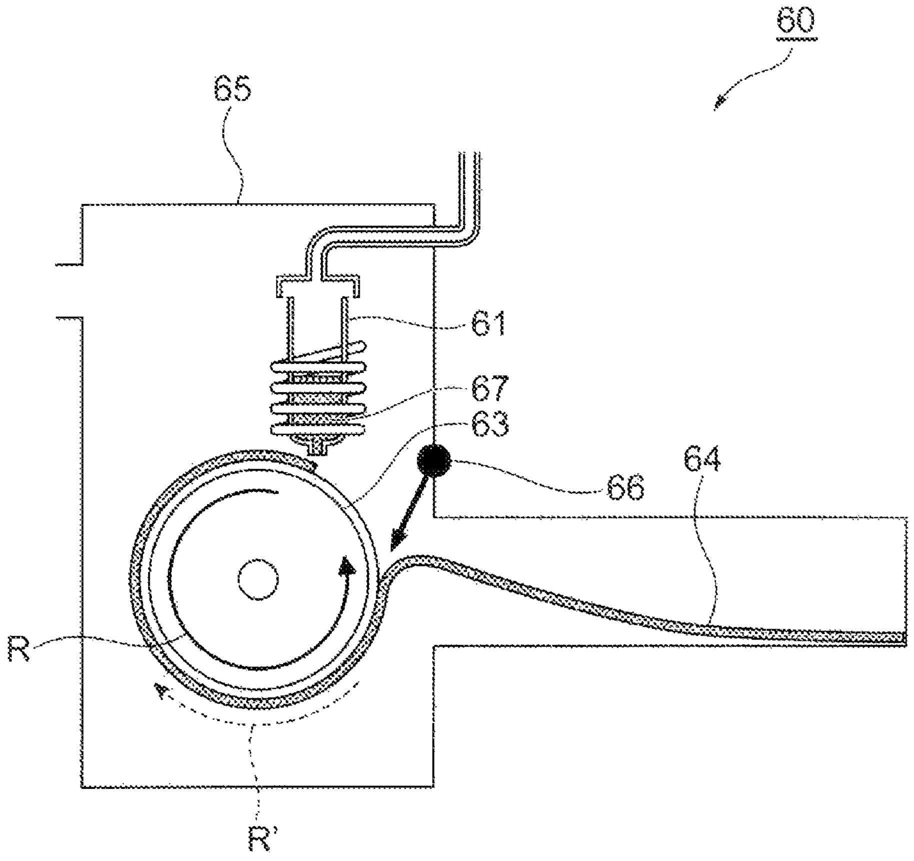
FIG. 5 is a schematic cross-sectional view of a strip casting apparatus that is used in manufacturing of a soft magnetic alloy strip (soft magnetic alloy ribbon).

A strip casting method may be performed by using a strip casting apparatus 60 illustrated in FIG. 5. The strip casting apparatus 60 includes a nozzle 61, a cooling roll 63 (cylindrical body), a peeling gas spraying device 66, and a chamber 65 containing the components. FIG. 5 illustrates a cross-section of the entirety of the strip casting apparatus 60 in a direction orthogonal to a rotation axial line of the cooling roll 63.

In the strip casting method, a molten metal 67 is poured onto a surface of the rotating cooling roll 63 by the nozzle 61. A composition of the molten metal 67 that is used in the strip casting method may be the same as the composition of the molten metal 21 that is used in the gas atomizing method.

The molten metal 67 is rapidly cooled on the surface of the cooling roll 63. Due to rapid cooling of the molten metal 67, the molten metal 67 is solidified on the surface of the cooling roll 63. As a result, an alloy strip 64 (i.e. alloy ribbon or alloy band) is formed along the surface of the cooling roll 63. The alloy strip 64 may be the same composition as in the fine powder (fine powder before the heat treatment) formed by the gas atomizing method except for the shape. That is, in the alloy strip 64, a plurality of Fe atom clusters are unevenly dispersed in a metalloid. A DSC curve of the alloy strip 64 has an exothermic peak caused by generation of a nanocrystal, but from the same reason as in the fine powder formed by the gas atomizing method, it is difficult to detect Tg lower than the temperature Tp of the exothermic peak from the DSC curve of the alloy strip 64 before a heat treatment. The heat treatment on the alloy strip 64 is performed under the same conditions as in the heat treatment on the fine powder formed by the gas atomizing method. Due to the heat treatment on the alloy strip 64, a Fe-based nanocrystal is formed from the Fe atom clusters in the alloy strip 64, and the metalloid in the alloy strip 64 is concentrated to form metallic glass. That is, a ribbon of the soft magnetic alloy including the Fe-based nanocrystal and the metallic glass is obtained through the heat treatment on the alloy strip 64. The DSC curve of the ribbon of the soft magnetic alloy subjected to the heat treatment can have Tg.

The strip casting method according to this embodiment is a single roll method using one cooling roll 63.

The surface of the cooling roll 63 is constantly controlled by a refrigerant flowing through the inside of the cooling roll 63. A temperature of the surface of the cooling roll 63 is 0° C. or lower. Since the temperature of the surface of the cooling roll 63 is 0° C. or lower, a large temperature difference is likely to occur between a surface (contact surface) of the alloy strip 64 that comes into contact with the surface of the cooling roll 63, and a rear surface (non-contact surface), and the contact surface of the alloy strip 64 is likely to be locally cooled. As a result, the Fe atom clusters are likely to be formed in the alloy strip 64, and the plurality of Fe atom clusters are likely to be unevenly dispersed in the metalloid. As in the single roll method in the related art, in a case where the temperature of the surface of the cooling roll 63 is from 5° C. to 30° C., or from 10° C. to 80° C., it is difficult to manufacture the alloy strip 64 having the uneven inner structure as described above. A lower limit value of the temperature of the surface of the cooling roll 63 is not particularly limited as long the temperature is higher than a freezing point of the refrigerant. The refrigerant may be a liquid having a freezing point of lower than 0° C. For example, the refrigerant may be ethylene glycol diluted with water. A material of the cooling roll 63 is not particularly limited. For example, the surface of the cooling roll 63 may consist of Cu.

A rotation direction R of the cooling roll 63 is opposite to a rotation direction R' of a cooling roll in the related art. As a result, time for which the alloy strip 64 is in contact with the cooling roll 63 is lengthened, and thus the alloy strip 64 can be more rapidly cooled in comparison to the single roll method in the related art.

In a case where the rotation direction R of the cooling roll 63 is opposite to the rotation direction R' of the cooling roll in the related art, it is possible to easily control time (that is, cooling time) for which the alloy strip 64 is in contact with the cooling roll 63 through adjustment of a gas pressure of the peeling gas sprayed from the spraying device 66. For example, when peeling timing of the alloy strip 64 from the cooling roll 63 is made faster by increasing the pressure of the peeling gas, the cooling time can be shortened. In contrast, when the peeling timing of the alloy strip 64 from the cooling roll 63 is delayed by reducing the pressure of the peeling gas, the cooling time can be lengthened.

An atmosphere inside the chamber 65 may be an Ar gas. The atmosphere inside the chamber 65 may be approximately vacuum. A dew point of the atmosphere inside the chamber 65 may be adjusted to prevent dew condensation. For example, a vapor pressure inside the chamber 65 may be 11 hPa or less, or 1 hPa or less. A lower limit value of the vapor pressure is not particularly limited.

For example, the thickness of the alloy strip 64 may be from 15 μm to 30 μm. The thickness of the alloy strip 64 may be controlled through adjustment of the rotation speed of the cooling roll 63. The thickness of the alloy strip 64 may be controlled through adjustment of an interval from the cooling roll 63. The thickness of the alloy strip 64 may be controlled through adjustment of the temperature of the molten metal 67.

(Electronic Component)

An electronic component according to this embodiment includes the above-described soft magnetic alloy. For example, the electronic component may be an inductor, a transformer, a choke coil, and an electromagnetic interference (EMI) filter. The electronic components may include a coil, and a magnetic core that is disposed on an inner side of the coil. The electronic component may be a magnetic head or an electromagnetic wave shield.

(Magnetic Core)

A magnetic core for the electronic component includes the soft magnetic alloy powder according to this embodiment. For example, the magnetic core may include the soft magnetic alloy powder and a binder. The binder binds a plurality of soft magnetic alloy particles included in the soft magnetic alloy powder. An inner side of the coil may be filled with a mixture of the soft magnetic alloy powder and the binder, and the entirety of the coil may be covered with the mixture of the soft magnetic alloy powder and the binder.

In a case where the soft magnetic alloy particle is not covered with a coating part having an electrical insulation property, the magnetic core may further include an additive having an electrical insulation property in addition to the soft magnetic alloy powder and the binder. When the additive is interposed between the soft magnetic alloy particles in the magnetic core, electrical conduction between the soft magnetic alloy particles is suppressed, and thus a withstand voltage of the magnetic core increases. In a case where the soft magnetic alloy particles are not covered with the coating part, the magnetic core may be manufactured by the following method.

A mixture including a soft magnetic alloy powder, a binder, and additive is prepared. For example, the binder may include a thermosetting resin such as a silicone resin and an epoxy resin. The mass of the binder may be from 1 to 10 parts by mass with respect to 100 parts by mass of soft magnetic alloy powder. The additive has an electrical insulation property. For example, the additive may be the above-described oxide glass. That is, the additive may be at least one kind of glass selected from the group consisting of phosphate-based glass ($P_2O_5$-based glass), bismuthate-based glass ($Bi_2O_3$-based glass), silicate-based glass ($SiO_2$-based glass), and borosilicate-based glass ($B_2O_3$—$SiO_2$-based glass). The additive may be a powder of oxide glass. The mass of the additive may be from 0.05 to 20 parts by mass with respect to 100 parts by mass of soft magnetic alloy powder.

A content of $P_2O_5$ in the $P_2O_5$-based glass may be from 50% by mass to 100% by mass. For example, the $P_2O_5$-based glass may be $P_2O_5$—ZnO—$R_2O$—$Al_2O_3$-based glass. R represents an alkali metal.

A content of $Bi_2O_3$ in the $Bi_2O_3$-based glass may be from 50% by mass to 100% by mass. For example, the $Bi_2O_3$-based glass may be $Bi_2O_3$—ZnO—$B_2O_3$—$SiO_2$-based glass.

A content of $B_2O_3$ in $B_2O_3$—$SiO_2$-based glass may be from 10% by mass to 90% by mass, and a content of $SiO_2$ in the $B_2O_3$—$SiO_2$-based glass may be from 10% by mass to 90% by mass. For example, the $B_2O_3$—$SiO_2$-based glass may be BaO—ZnO—$B_2O_3$—$SiO_2$—$Al_2O_3$-based glass.

The magnetic core is obtained by a molding process of compressing the mixture while heating the mixture. For example, the magnetic core is obtained by heating and compression of the mixture by using a mold. Plastic deformation of each soft magnetic alloy particle in the mixture occurs due to heating and compression of the mixture, and a gap between soft magnetic alloy particles decreases. As a result, a filling rate of the soft magnetic alloy powder in the magnetic core increases. In addition, a plurality of the soft magnetic alloy particles are bound to each other through thermosetting of the binder located between the soft magnetic alloy particles. In addition, the additive in the mixture is softened due to the heating and compression of the mixture, and is interposed between the soft magnetic alloy particles. As a result, soft magnetic alloy particles adjacent to each other are electrically insulated.

A temperature (molding temperature) of the mixture in the molding process is equal to or higher than Tg and lower than Tx. At a temperature of equal to or higher than Tg and lower than Tx, a part or the entirety of the metallic glass in the soft magnetic alloy particle becomes a supercooled liquid, and the soft magnetic alloy particle 1 becomes soft. As a result, plastic deformation of the soft magnetic alloy particle occurs in accordance with compression of the mixture, and a void between a plurality of the soft magnetic alloy particles decreases, and a dense magnetic core having high relative permeability is formed. As the additive, an additive having a softening point at a temperature of equal to or greater than Tg and lower than Tx may be used.

A pressure (molding pressure) applied to the mixture in the molding process may be from 400 MPa to 2000 MPa. When the molding pressure is 400 MPa or greater, a filling rate of the soft magnetic alloy powder in the magnetic core is likely to increase, and the relative permeability of the magnetic core is likely to increase. When the molding pressure is 2000 MPa or less, a coercivity of the magnetic core is likely to decrease.

In the molding process, a magnetic field may be applied to the mixture. A heat treatment on the magnetic core obtained by the molding process may be performed. Distortion of the magnetic core is eliminated by the heat treatment on the magnetic core.

In a case where each soft magnetic alloy particle is covered with a coating part in advance, the magnetic core may not include the additive. A method for manufacturing the magnetic core using the soft magnetic alloy particle covered with the coating part may be the same as the method for manufacturing the magnetic core except that the additive is not used.

The invention is not limited to the above-described embodiment. Various modifications of the invention can be made within a range not departing from the gist of the invention, and these modification examples are also included in the invention. For example, the magnetic core may be manufactured by punching or compressing a stacked body consisting of a plurality of soft magnetic alloy ribbons stacked via an insulating resin.

EXAMPLES

The invention will be described in more detail with reference to the following examples and comparative examples. However, the invention is not limited to the following examples any more.

Soft magnetic alloy powders of Samples 1a to 105 were manufactured and were analyzed by the following method.

(Composition of Metal Raw Material)

A plurality of kinds of raw materials were mixed in a predetermined ratio to prepare a metal raw material of a soft magnetic alloy powder of each of Samples 1a, 1b, 1c, 1d, 1e, 1f, and 1g. A composition of the entirety of the metal raw material of each of Samples 1a, 1b, 1c, 1d, 1e, 1f, and 1g is shown in a column of "Chemical formula" in Table 1.

A plurality of kinds of raw materials were mixed in a predetermined ratio to prepare a metal raw material of a soft magnetic alloy powder of each of Samples 2 to 33. A composition of the entirety of the metal raw material of Samples 2 to 33 is expressed by the following Chemical Formula 1a. h in the following Chemical Formula 1a is equal to a+b+c+d. a, b, c, d, and 1-h in Chemical formula 1a of each of Samples 2 to 33 are shown in Table 2.

$$Fe_{1-h}Nb_aB_bP_cSi_d \quad (1a)$$

A plurality of kinds of raw materials were mixed in a predetermined ratio to prepare a metal raw material of a soft magnetic alloy powder of each of Samples 34 to 37. A composition of the entirety of the metal raw material of each of Samples 34 to 37 is expressed by the following Chemical Formula 1b. h in the following Chemical Formula 1b equals to a+b+c+d. (1-β)×(1-h), β, a, b, c, and d in Chemical Formula 1b of Samples 34 to 37 are shown in Table 3.

$$(Fe_{1-\beta}Cu_\beta)_{1-h}Nb_aB_bP_cSi_d \quad (1b)$$

A plurality of kinds of raw materials were mixed in a predetermined ratio to prepare a metal raw material of a soft magnetic alloy powder of each of Samples 38 to 47. A composition of the entirety of the metal raw material of each of Samples 38 to 47 is expressed by the following Chemical Formula 1c. An element M in Chemical Formula 1c of each of Samples 38 to 47 is shown in Table 4.

$$Fe_{0.810}M_{0.070}B_{0.090}P_{0.030} \quad (1c)$$

A plurality of kinds of raw materials were mixed in a predetermined ratio to prepare a metal raw material of a soft magnetic alloy powder of each of Samples 48 to 105. A composition of the entirety of the metal raw material of each of Samples 48 to 105 is expressed by the following Chemical Formula 1d. An element X1, α×0.810, an element X2, and β×0.810 in Chemical Formula 1d of each of Samples 48 to 105 are shown in Table 5 or Table 6.

$$(Fe_{1-\alpha-\beta}X1_\alpha X2_\beta)_{0.810}Nb_{0.070}B_{0.090}P_{0.030} \quad (1d)$$

All samples described in Tables 2 to 6 are classified as Examples.

(Manufacturing of Soft Magnetic Alloy Powder of Each of Samples 1d, 1e, and 2 to 105)

<New Gas Atomizing Method>

A fine powder (metal fine particles) of each sample was manufactured by a new gas atomizing method using the metal raw material of each of Samples 1d, 1e, and 2 to 105. In the new gas atomizing method, the gas atomizing apparatus illustrated in FIG. 3 and FIG. 4 was used. Details of the new gas atomizing method are as follows.

The metal raw material was contained in the container 22. The metal raw material in the container 22 was heated by high frequency induction using the coil 24, thereby obtaining the molten metal 21. A temperature of the molten metal 21 was 1600° C. A vapor pressure inside the container 22 was 4 hPa or less.

An atmosphere inside the tubular body 32 of the cooling unit 30 was set to vacuum, and cooling water was supplied from the introduction part 36 to the inside of the tubular body 32, thereby forming the water flow 50 at the inside of the tubular body 32. A shape of the water flow 50 was an inverted cone. A pressure (pump pressure) of the water flow 50 was 10 MPa. An inner diameter of the tubular body 32 was 300 mm. A ratio (D1/D2) of D1 and D2 in FIG. 4 was ½. An angle θ1 in FIG. 4 was 20°.

The molten metal 21 was supplied dropwise from the ejection port of the container 22 toward the cooling unit 30. And, the high-pressure gas 26*a* was sprayed from the gas nozzle 26 to the molten metal 21. The high-pressure gas 26*a* was an argon gas. A pressure of the high-pressure gas 26*a* was 5 MPa. Due to spraying of the high-pressure gas 26*a*, the molten metal 21 was converted into a plurality of fine liquid droplets 21*a*. The liquid droplets 21*a* moved to the inside of the tubular body 32 of the cooling unit 30 along the high-pressure gas 26*a*. The liquid droplets 21*a* collided with the inverted conical water flow 50 inside the tubular body 32, and the liquid droplets 21*a* were decomposed into finer liquid droplets. The fine liquid droplets were rapidly cooled with the water flow 50, thereby obtaining fine powder (metal fine particles). The water flow 50 (cooling water) including the fine powder was discharged from the discharge part 34 to the outside of the tubular body 32, and the fine powder was recovered from the cooling water.

<Analysis of Fine Powder Before Heat Treatment>

Before performing a heat treatment on the fine powder, the fine powder of each of Samples 1d, 1e, and 2 to 105 was analyzed by the following method.

An X-ray diffraction pattern of the fine powder of each of Samples 1d, 1e, and 2 to 105 was measured by using a powder X-ray diffraction device.

A mixture of the fine powder of each sample and a thermosetting resin was molded, and the thermosetting resin was cured to obtain a molded body. The molded body was processed with ion milling to obtain a thin film (measurement sample). A cross-section of the fine powder (metal fine particles) of each sample included in the thin film was observed with the STEM.

A crystal structure of the fine powder of each of Samples 1d, 1e, and 2 to 105 was analyzed on the basis of the X-ray diffraction pattern and the observation with the STEM. In any sample, a nano-scale crystal was not found in a metal fine particle, and a diffracted X-ray derived from a body-centered cubic structure was not detected. That is, the fine powder of each of Samples 1d, 1e, and 2 to 105 consisted of an amorphous alloy.

<Heat Treatment>

After carrying out the new gas atomizing method, a heat treatment on the fine powder of each sample was performed in a non-oxidizing atmosphere. The non-oxidizing atmosphere was a nitrogen gas. A temperature (heat treatment temperature) of the fine powder in the heat treatment was 600° C. A temperature rising rate was 5 K/minute. A time (heat treatment time) for which the temperature of the fine powder was maintained at the heat treatment temperature was one hour.

The soft magnetic alloy powder of each of Samples 1d, 1e, and 2 to 105 was manufactured by the new gas atomizing method and the heat treatment described above.

(Manufacturing of Soft Magnetic Alloy Powder of Sample 1a)

The fine powder of Sample 1a was manufactured by an old atomizing method. In the old atomizing method, a gas atomizing apparatus in which a structure of the introduction part 36 for cooling water was changed was used. A cylindrical water flow circulating along the inner wall of the tubular body 32 was formed by the structure change of the introduction part 36. The liquid droplet 21*a* was rapidly cooled with the cylindrical water flow to obtain a fine powder of Sample 1a. The old gas atomizing method was the same as the new gas atomizing method except for the shape of the water flow.

The fine powder of Sample 1a was analyzed before the heat treatment. An analysis method for the fine powder of Sample 1a was the same as an analysis method of the fine powder of each of Samples 1d, 1e, and 2 to 105. The nano-scale crystal was not found in a metal fine particle of Sample 1a. The diffracted X-ray derived from the body-centered cubic structure was not detected from Sample 1a. That is, the fine powder of Sample 1a consisted of an amorphous alloy.

After carrying out the old gas atomizing method, a heat treatment on the fine powder of Sample 1a was performed. The heat treatment method for the fine powder of Sample 1a was the same as the heat treatment method for the fine powder of each of Samples 1d, 1e, and 2 to 105.

A soft magnetic alloy powder of Sample 1a was manufactured by the old gas atomizing method and the heat treatment described above.

(Manufacturing of Soft Magnetic Alloy Powders of Samples 1b and 1c)

A fine powder (metal fine particles) of each sample was manufactured by the new gas atomizing method using the metal raw material of each of Samples 1b and 1c.

The fine powder of each of Samples 1b and 1c was analyzed by the same method as in the fine powder of each of Samples 1d, 1e, and 2 to 105 before a heat treatment. An analysis method for the fine powder of each of Samples 1b and 1c was the same as the analysis method of the fine powder of each of Samples 1d, 1e, and 2 to 105. In any case of Samples 1b and 1c, a nano-scale crystal was not found in the metal fine particle, and a diffracted X-ray derived from the body-centered cubic structure was not detected. That is, the fine powder of each of Samples 1b and 1c consisted of an amorphous alloy.

A heat treatment on the fine powder of each of Samples 1b and 1c was not performed. That is, the soft magnetic alloy powder of each of Samples 1b, 1c, and 1d was manufactured by only the new gas atomizing method. Only in the case of Samples 1b and 1c, the soft magnetic alloy powder represents a fine powder before the heat treatment.

(Manufacturing of Soft Magnetic Alloy Powders of Samples 1f and 1g)

An alloy strip of Sample 1g was manufactured from the metal raw material of Sample 1g by the strip casting method according to the above embodiment. That is, the alloy strip of Sample 1g was manufactured from the metal raw material of Sample 1g by the strip casting method illustrated in FIG. 5.

In manufacturing of the alloy strip of Sample 1g, ethylene glycol diluted with water was used as the refrigerant of the cooling roll 63. In the manufacturing of the alloy strip of Sample 1g, a temperature of the surface of the cooling roll 63 was maintained at −10° C.

The alloy strip of Sample 1f was manufactured by the same method as in Sample 1g except for a composition of the refrigerant and the temperature of the surface of the cooling roll 63. In manufacturing of the alloy strip of Sample 1f, as the refrigerant of the cooling roll 63, water was used. In manufacturing of the alloy strip of Sample 1f, the temperature of the surface of the cooling roll 63 was maintained at 25° C.

A fine powder of each of Sample 1f and 1g was manufactured by individually pulverizing the alloy strip of each of Samples 1f and 1g. The fine powder of each of Samples 1f and 1g was analyzed before a heat treatment by the same method as in the fine powder of each of Samples 1d, 1e, and 2 to 105. An analysis method for the fine powder of each of Samples 1f and 1g was the same as the analysis method for the fine powder of each of Samples 1d, 1e, and 2 to 105. In any case of Samples 1f and 1g, a nano-scale crystal was not found in the metal fine particle, and a diffracted X-ray derived from the body-centered cubic structure was not detected. That is, the fine powder of each of Samples 1f and 1g consisted of an amorphous alloy.

The heat treatment on the alloy strip of each of Samples 1f and 1g was performed. A heat treatment method for the alloy strip was the same as the heat treatment method for the fine powder of each of Samples 1d, 1e, and 2 to 105.

After the heat treatment on the alloy strip of each of Samples 1f and 1g, a soft magnetic alloy powder of each of Samples 1f and 1g was manufactured by individually pulverizing the alloy strip of each of Samples 1f and 1g.

(Analysis of Soft Magnetic Alloy Powder)

The soft magnetic alloy powder of each of Samples 1a to 105 was analyzed by the following method.

An X-ray diffraction pattern of the soft magnetic alloy powder of each of Samples 1a to 105 was measured by using the powder X-ray diffraction device.

A mixture of the soft magnetic alloy powder of each sample and a thermosetting resin was molded, and the thermosetting resin was cured to obtain a molded body. The molded body was processed with ion milling to obtain a thin film (measurement sample). A cross-section of the soft magnetic alloy powder (soft magnetic alloy particles) of each sample included in the thin film was observed with the STEM. In the cross-section observed with the STEM, a composition of the soft magnetic alloy powder of each sample was analyzed with EDS.

A crystal structure of the fine powder of each of Samples 1a to 105 was analyzed on the basis of the X-ray diffraction pattern and the observation with the STEM.

In the soft magnetic alloy particle of each of Samples 1a, 1d, 1e, 1f, 1g, and 2 to 105, a plurality of Fe-based nanocrystals were dispersed in an amorphous alloy. In any case of Samples 1a, 1d, 1e, 1f, 1g, and 2 to 105, a diffracted X-ray derived from the body-centered cubic structure was detected.

In any case of Samples 1b and 1c, the Fe-based nanocrystal was not found in the soft magnetic alloy, and the diffracted X-ray derived from the body-centered cubic structure was not detected. That is, the soft magnetic alloy powder of each of Samples 1b and 1c consisted of only an amorphous alloy.

In any case of Samples 1a to 105, a composition of the soft magnetic alloy powder approximately matched the composition of the entirety of the metal raw material.

A DSC curve of the soft magnetic alloy powder of each of Samples 1a to 105 was measured. A temperature rising rate of the soft magnetic alloy powder in the measurement of the DSC curve was 40 K/minute. In the measurement of the DSC curve, alumina was used as a reference sample.

In any case of Samples 1d, 1e, 1d, and 2 to 105, the DSC curve of the soft magnetic alloy powder had the glass transition point Tg. Accordingly, the amorphous alloy included in the soft magnetic alloy particle of each of Samples 1d, 1e, 1g, and 2 to 105 was metallic glass. In any case of Samples 1d, 1e, 1g, and 2 to 105, the DSC curve of the soft magnetic alloy powder had not only Tg but also the crystallization temperature Tx (crystallization initiation temperature) and the maximum exothermic peak. In any case of Samples 1d, 1e, 1g, and 2 to 105, the temperature Tp of the maximum exothermic peak was higher than each of Tg and Tx. In any case of Samples 1d, 1e, 1g, and 2 to 105, Tg was lower than Tx.

Tg of each of Samples 1d, 1e, 1g, 2 to 33, and 38 to 105 was equal to or higher than 350° C. and lower than 600° C. Tx of each of Samples 1d, 1e, 1g, 2 to 33, and 38 to 105 was higher than 600° C.

Tg of each of Samples 34 to 37 was equal to or higher than 350° C. and lower than 400° C. Tx of each of Samples 34 to 37 was higher than 400° C.

In any case of Samples 1a, 1b, 1c, and 1f, the DSC curve of the soft magnetic alloy powder did not have the glass transition point Tg. Accordingly, the amorphous alloy included in the soft magnetic alloy particle of each of Samples 1a, 1b, 1c, and 1f was not metallic glass. That is, the soft magnetic alloy of each of Samples 1a, 1b, 1c, and 1f did not include metallic glass. In any case of Samples 1a, 1b, 1c, and 1f, the DSC curve of the soft magnetic alloy powder had an exothermic peak.

A molding pressure of each of Samples 1a to 1g is shown in the following Table 1.

The molding pressure of each of Samples 2 to 105 was 1000 MPa.

A disc-shaped magnetic core was obtained by the above-described method. A diameter of the magnetic core was 10.0 mm, and the thickness of the magnetic core was 4.0 mm A relative density of the magnetic core of each of Samples 1a to 105 was measured. The relative density of each magnetic core is shown in the following Tables. The relative density is preferably 0.85 or more.

TABLE 1

| Classification | Sample No. | Chemical Formula | Manufacturing | Crystallinity before heat treatment | Heat treatment | Tg | Molding pressure | Hc (A/m) | Relative density |
|---|---|---|---|---|---|---|---|---|---|
| Comparative Example | 1a | $Fe_{79}Nb_6B_9P_3Si_3$ | Old gas atomizing method | Amorphous | Performed | None | 1000 MPa | 250 | 0.67 |
| Comparative Example | 1b | $Fe_{79}Nb_6B_9P_3Si_3$ | New gas atomizing method | Amorphous | None | None | 400 MPa | 576 | 0.70 |
| Comparative Example | 1c | $Fe_{79}Nb_6B_9P_3Si_3$ | New gas atomizing method | Amorphous | None | None | 1000 MPa | 617 | 0.71 |
| Example | 1d | $Fe_{79}Nb_6B_9P_3Si_3$ | New gas atomizing method | Amorphous | Performed | Present | 400 MPa | 210 | 0.93 |
| Example | 1e | $Fe_{79}Nb_6B_9P_3Si_3$ | New gas atomizing method | Amorphous | Performed | Present | 1000 MPa | 232 | 0.96 |
| Comparative Example | 1f | $Fe_{79}Nb_6B_9P_3Si_3$ | Strip casting method (25° C.) | Amorphous | Performed | None | 1000 MPa | 258 | 0.68 |
| Example | 1g | $Fe_{79}Nb_6B_9P_3Si_3$ | Strip casting method (−10° C.) | Amorphous | Performed | Present | 1000 MPa | 241 | 0.85 |

(Measurement of Coercivity)

A coercivity of the soft magnetic alloy powder of each of Samples 1a to 105 was measured by the following method.

20 g of soft magnetic alloy powder and paraffin were contained in a tubular plastic case. An inner diameter φ of the plastic case was 6 mm, and a length of the plastic case was 5 mm. The paraffin in the plastic case was melted by heating, and the paraffin was solidified to obtain a measurement sample. The coercivity of the measurement sample was measured. In the measurement of the coercivity, a coercimeter (K-HC1000 type) manufactured by Tohoku Steel Co., Ltd. was used. A measurement magnetic field was 150 kA/m. The coercivity Hc (unit: A/m) of each of Samples 1a to 105 is shown in the following Tables. The coercivity Hc is preferably 450 A/m or less.

(Manufacturing of Magnetic Core and Measurement of Relative Density)

A magnetic core of each of Samples 1a to 105 was manufactured from the soft magnetic alloy powder of each of Samples 1a to 105 by the following molding process.

A mixture consisting of the soft magnetic alloy powder, a silicone resin, and an additive was prepared. The mass of the silicon resin was 1.2 parts by mass with respect to 100 parts by mass of soft magnetic alloy powder. The mass of the additive was 0.5 parts by mass with respect to 100 parts by mass of soft magnetic alloy powder.

In manufacturing of the magnetic core of each of Samples 1a to 33, and Samples 38 to 105, borosilicate-based glass was used as the additive.

In manufacturing of the magnetic core of each of Samples 34 to 37, phosphate-based glass was used as the additive.

In the molding process, the mixture was compressed while being heated by using a mold.

A molding temperature of each of Samples 1a to 33, and Samples 38 to 105 was 600° C.

The molding temperature of each of Samples 34 to 37 was 400° C.

TABLE 2

| Sample No. | Fe 1 − h | Nb a | B b | P c | Si d | Hc (A/m) | Relative density |
|---|---|---|---|---|---|---|---|
| 2 | 0.830 | 0.030 | 0.090 | 0.000 | 0.050 | 324 | 0.95 |
| 3 | 0.810 | 0.030 | 0.090 | 0.000 | 0.070 | 240 | 0.96 |
| 4 | 0.780 | 0.030 | 0.090 | 0.000 | 0.100 | 130 | 0.98 |
| 5 | 0.750 | 0.030 | 0.090 | 0.000 | 0.130 | 90 | 0.98 |
| 6 | 0.730 | 0.030 | 0.090 | 0.000 | 0.150 | 110 | 0.98 |
| 7 | 0.680 | 0.030 | 0.090 | 0.000 | 0.200 | 250 | 0.96 |
| 8 | 0.820 | 0.040 | 0.090 | 0.000 | 0.050 | 260 | 0.96 |
| 9 | 0.770 | 0.040 | 0.090 | 0.000 | 0.100 | 130 | 0.98 |
| 10 | 0.720 | 0.040 | 0.090 | 0.000 | 0.150 | 120 | 0.98 |
| 11 | 0.830 | 0.050 | 0.090 | 0.030 | 0.000 | 280 | 0.96 |
| 12 | 0.810 | 0.050 | 0.090 | 0.050 | 0.000 | 290 | 0.96 |
| 13 | 0.790 | 0.050 | 0.090 | 0.070 | 0.000 | 320 | 0.95 |
| 14 | 0.760 | 0.050 | 0.090 | 0.100 | 0.000 | 360 | 0.95 |
| 15 | 0.880 | 0.060 | 0.030 | 0.030 | 0.000 | 250 | 0.96 |
| 16 | 0.860 | 0.060 | 0.050 | 0.030 | 0.000 | 280 | 0.96 |
| 17 | 0.840 | 0.060 | 0.070 | 0.030 | 0.000 | 320 | 0.95 |
| 18 | 0.810 | 0.060 | 0.100 | 0.030 | 0.000 | 335 | 0.95 |
| 19 | 0.760 | 0.060 | 0.150 | 0.030 | 0.000 | 395 | 0.94 |
| 20 | 0.810 | 0.070 | 0.090 | 0.030 | 0.000 | 210 | 0.97 |
| 21 | 0.800 | 0.070 | 0.100 | 0.030 | 0.000 | 240 | 0.96 |
| 22 | 0.750 | 0.070 | 0.150 | 0.030 | 0.000 | 385 | 0.94 |
| 23 | 0.790 | 0.070 | 0.090 | 0.050 | 0.000 | 280 | 0.96 |
| 24 | 0.740 | 0.070 | 0.090 | 0.100 | 0.000 | 340 | 0.95 |
| 25 | 0.790 | 0.020 | 0.090 | 0.100 | 0.000 | 240 | 0.96 |
| 26 | 0.740 | 0.020 | 0.090 | 0.150 | 0.000 | 390 | 0.94 |
| 27 | 0.690 | 0.020 | 0.090 | 0.200 | 0.000 | 400 | 0.94 |
| 28 | 0.790 | 0.010 | 0.100 | 0.100 | 0.000 | 320 | 0.95 |
| 29 | 0.740 | 0.010 | 0.150 | 0.100 | 0.000 | 350 | 0.95 |
| 30 | 0.690 | 0.010 | 0.200 | 0.100 | 0.000 | 280 | 0.96 |
| 31 | 0.780 | 0.100 | 0.090 | 0.030 | 0.000 | 320 | 0.95 |
| 32 | 0.760 | 0.130 | 0.080 | 0.030 | 0.000 | 370 | 0.95 |
| 33 | 0.750 | 0.150 | 0.070 | 0.030 | 0.000 | 400 | 0.94 |

TABLE 3

| Sample No. | Fe (1 − β) × (1 − h) | Cu β | Nb a | B b | P c | Si d | Hc (A/m) | Relative density |
|---|---|---|---|---|---|---|---|---|
| 34 | 0.836 | 0.005 | 0.000 | 0.080 | 0.040 | 0.040 | 381 | 0.96 |
| 35 | 0.820 | 0.005 | 0.000 | 0.100 | 0.040 | 0.040 | 401 | 0.95 |
| 36 | 0.770 | 0.005 | 0.000 | 0.150 | 0.040 | 0.040 | 435 | 0.95 |
| 37 | 0.720 | 0.005 | 0.000 | 0.200 | 0.040 | 0.040 | 449 | 0.93 |

TABLE 4

| Sample No. | Element M | Hc (A/m) | Relative density |
|---|---|---|---|
| 20 | Nb | 210 | 0.97 |
| 38 | Hf | 200 | 0.97 |
| 39 | Zr | 195 | 0.97 |
| 40 | Ta | 188 | 0.98 |
| 41 | Mo | 195 | 0.97 |
| 42 | W | 200 | 0.97 |
| 43 | V | 200 | 0.97 |
| 44 | Ti | 215 | 0.96 |
| 45 | $Nb_{0.5}Hf_{0.5}$ | 192 | 0.97 |
| 46 | $Zr_{0.5}Ta_{0.5}$ | 183 | 0.97 |
| 47 | $Nb_{0.4}Hf_{0.3}Zr_{0.3}$ | 188 | 0.97 |

TABLE 5

| Sample No. | X1 | α × 0.810 | X2 | β × 0.810 | Hc (A/m) | Relative density |
|---|---|---|---|---|---|---|
| 20 | — | 0.0000 | — | 0.0000 | 210 | 0.97 |
| 48 | Co | 0.0100 | — | 0.0000 | 239 | 0.96 |
| 49 | Co | 0.1000 | — | 0.0000 | 273 | 0.95 |
| 50 | Co | 0.4000 | — | 0.0000 | 337 | 0.95 |
| 51 | Ni | 0.0100 | — | 0.0000 | 205 | 0.96 |
| 52 | Ni | 0.1000 | — | 0.0000 | 198 | 0.97 |
| 53 | Ni | 0.4000 | — | 0.0000 | 186 | 0.97 |
| 54 | — | 0.0000 | Al | 0.0010 | 173 | 0.97 |
| 55 | — | 0.0000 | Al | 0.0050 | 200 | 0.96 |
| 56 | — | 0.0000 | Al | 0.0100 | 194 | 0.97 |
| 57 | — | 0.0000 | Al | 0.0300 | 205 | 0.96 |
| 58 | — | 0.0000 | Zn | 0.0010 | 217 | 0.96 |
| 59 | — | 0.0000 | Zn | 0.0050 | 220 | 0.96 |
| 60 | — | 0.0000 | Zn | 0.0100 | 202 | 0.96 |
| 61 | — | 0.0000 | Zn | 0.0300 | 215 | 0.96 |
| 62 | — | 0.0000 | Sn | 0.0010 | 201 | 0.96 |
| 63 | — | 0.0000 | Sn | 0.0050 | 203 | 0.96 |
| 64 | — | 0.0000 | Sn | 0.0100 | 199 | 0.96 |
| 65 | — | 0.0000 | Sn | 0.0300 | 211 | 0.96 |
| 66 | — | 0.0000 | Cu | 0.0010 | 190 | 0.97 |
| 67 | — | 0.0000 | Cu | 0.0050 | 182 | 0.97 |
| 68 | — | 0.0000 | Cu | 0.0100 | 175 | 0.97 |
| 69 | — | 0.0000 | Cu | 0.0300 | 187 | 0.97 |
| 70 | — | 0.0000 | Cr | 0.0010 | 219 | 0.96 |
| 71 | — | 0.0000 | Cr | 0.0050 | 199 | 0.96 |
| 72 | — | 0.0000 | Cr | 0.0100 | 197 | 0.97 |
| 73 | — | 0.0000 | Cr | 0.0300 | 219 | 0.96 |
| 74 | — | 0.0000 | Bi | 0.0010 | 209 | 0.96 |
| 75 | — | 0.0000 | Bi | 0.0050 | 191 | 0.97 |
| 76 | — | 0.0000 | Bi | 0.0100 | 191 | 0.97 |
| 77 | — | 0.0000 | Bi | 0.0300 | 224 | 0.96 |

TABLE 6

| Sample No. | X1 | α × 0.810 | X2 | β × 0.810 | Hc (A/m) | Relative density |
|---|---|---|---|---|---|---|
| 78 | — | 0.0000 | La | 0.0010 | 220 | 0.96 |
| 79 | — | 0.0000 | La | 0.0050 | 226 | 0.96 |
| 80 | — | 0.0000 | La | 0.0100 | 235 | 0.96 |
| 81 | — | 0.0000 | La | 0.0300 | 246 | 0.96 |
| 82 | — | 0.0000 | Y | 0.0010 | 228 | 0.96 |
| 83 | — | 0.0000 | Y | 0.0050 | 212 | 0.96 |

TABLE 6-continued

| Sample No. | X1 | α × 0.810 | X2 | β × 0.810 | Hc (A/m) | Relative density |
|---|---|---|---|---|---|---|
| 84 | — | 0.0000 | Y | 0.0100 | 219 | 0.96 |
| 85 | — | 0.0000 | Y | 0.0300 | 211 | 0.96 |
| 86 | — | 0.0000 | N | 0.0010 | 221 | 0.96 |
| 87 | — | 0.0000 | O | 0.0010 | 226 | 0.96 |
| 88 | — | 0.0000 | C | 0.0010 | 232 | 0.96 |
| 89 | — | 0.0000 | S | 0.0010 | 240 | 0.96 |
| 90 | Co | 0.1000 | Al | 0.0500 | 267 | 0.96 |
| 91 | Co | 0.1000 | Zn | 0.0500 | 330 | 0.95 |
| 92 | Co | 0.1000 | Sn | 0.0500 | 340 | 0.95 |
| 93 | Co | 0.1000 | Cu | 0.0500 | 243 | 0.96 |
| 94 | Co | 0.1000 | Cr | 0.0500 | 283 | 0.95 |
| 95 | Co | 0.1000 | Bi | 0.0500 | 279 | 0.95 |
| 96 | Co | 0.1000 | La | 0.0500 | 307 | 0.95 |
| 97 | Co | 0.1000 | Y | 0.0500 | 278 | 0.95 |
| 98 | Ni | 0.1000 | Al | 0.0500 | 193 | 0.97 |
| 99 | Ni | 0.1000 | Zn | 0.0500 | 196 | 0.97 |
| 100 | Ni | 0.1000 | Sn | 0.0500 | 212 | 0.96 |
| 101 | Ni | 0.1000 | Cu | 0.0500 | 172 | 0.97 |
| 102 | Ni | 0.1000 | Cr | 0.0500 | 196 | 0.97 |
| 103 | Ni | 0.1000 | Bi | 0.0500 | 201 | 0.96 |
| 104 | Ni | 0.1000 | La | 0.0500 | 224 | 0.96 |
| 105 | Ni | 0.1000 | Y | 0.0500 | 195 | 0.97 |

INDUSTRIAL APPLICABILITY

The soft magnetic alloy according to the invention is suitable for, for example, a material for a magnetic core of an inductor.

REFERENCE SIGNS LIST

1: soft magnetic alloy particle, 2: Fe-based nanocrystal, 3: metallic glass, Tg: glass transition point, Tx: crystallization temperature, Tp: temperature of maximum exothermic peak, ΔTx: supercooled liquid region width.

What is claimed is:

1. A soft magnetic alloy including:

a Fe-based nanocrystal, wherein the soft magnetic alloy further includes metallic glass, a differential scanning calorimetry curve of the soft magnetic alloy has a glass transition point Tg, a temperature rising rate of the soft magnetic alloy in measurement of the differential scanning calorimetry curve is 40 K/minute, a temperature Tp of a maximum exothermic peak in the differential scanning calorimetry curve is higher than the Tg, the soft magnetic alloy is expressed by the following Chemical Formula 1, $$(Fe_{1-\alpha-\beta}X1_{\alpha}X2_{\beta})_{1-h}M_{a}B_{b}P_{c}Si_{d} \quad (1)$$

provided that, h is a+b+c+d,

X1 is at least one element selected from the group consisting of Co and Ni,

X2 is at least one element selected from the group consisting of Al, Mn, Ag, Zn, Sn, As, Sb, Cr, Bi, N, O, S, and a rare earth element, M is at least one element selected from the group consisting of Nb, Hf, Zr, Ta, Mo, W, and V, a is from 0.0 to 0.15, b is from 0.0 to 0.20, c is from 0.0 to 0.20, d is from 0.0 to 0.20, $\alpha$ is 0 or more, $\beta$ is 0 or more, $\alpha+\beta$ is from 0 to 0.50, 1-h is more than 0.65 and 0.9 or less, and a unit of each of $\alpha$, $\beta$, a, b, c, d, and h in the Chemical Formula 1 is mole ratio.

2. The soft magnetic alloy according to claim 1, wherein an average grain size of the Fe-based nanocrystal is from 5 nm to 50 nm.

3. The soft magnetic alloy according to claim 1, wherein the differential scanning calorimetry curve has a crystallization temperature Tx, a supercooled liquid region width $\Delta$Tx is defined as Tx−Tg, and $\Delta$Tx is from 10K to 200K.

4. The soft magnetic alloy according to claim 1, wherein the Tp is from 600° C. to 800° C.

5. The soft magnetic alloy according to claim 1, wherein the soft magnetic alloy is a powder.

6. The soft magnetic alloy according to claim 5, wherein both the Fe-based nanocrystal and the metallic glass exist in one soft magnetic alloy particle constituting the powder.

7. The soft magnetic alloy according to claim 5, wherein a nanocrystal structure consisting of the metallic glass and a plurality of the Fe-based nanocrystals dispersed in the metallic glass is formed in one soft magnetic alloy particle constituting the powder.

8. The soft magnetic alloy according to claim 1, wherein the soft magnetic alloy is a ribbon.

9. The soft magnetic alloy according to claim 1, wherein both the Fe-based nanocrystal and the metallic glass exist in the soft magnetic alloy consisting of one alloy composition.

10. The soft magnetic alloy according to claim 1, wherein the soft magnetic alloy is covered with a coating part having an electrical insulation property.

11. The soft magnetic alloy according to claim 10, wherein the coating part is an oxide including an element common to the soft magnetic alloy.

12. An electronic component including:

the soft magnetic alloy according to claim 1.

13. An electronic component comprising:

a coil and a magnetic core disposed on an inner side of the coil, wherein the magnetic core includes the soft magnetic alloy according to claim 1.

* * * * *